(12) United States Patent
Sun

(10) Patent No.: US 12,447,957 B2
(45) Date of Patent: Oct. 21, 2025

(54) AUTOMOTIVE VEHICLE CONTROL CIRCUIT

(71) Applicant: ZF Automotive UK Limited, Solihull (GB)

(72) Inventor: Xiao-Dong Sun, Solihull (GB)

(73) Assignee: ZF Automotive UK Limited, Solihull (GB)

( * ) Notice: Subject to any disclaimer, the term of this patent is extended or adjusted under 35 U.S.C. 154(b) by 105 days.

(21) Appl. No.: 18/270,039

(22) PCT Filed: Dec. 30, 2021

(86) PCT No.: PCT/GB2021/053446
§ 371 (c)(1),
(2) Date: Jun. 28, 2023

(87) PCT Pub. No.: WO2022/144550
PCT Pub. Date: Jul. 7, 2022

(65) Prior Publication Data
US 2024/0075924 A1 Mar. 7, 2024

(30) Foreign Application Priority Data
Dec. 31, 2020 (GB) .................................... 2020838

(51) Int. Cl.
*B60W 30/12* (2020.01)
(52) U.S. Cl.
CPC ......... *B60W 30/12* (2013.01); *B60W 2510/20* (2013.01); *B60W 2552/53* (2020.02); *B60W 2710/20* (2013.01)

(58) Field of Classification Search
CPC .................................................... B60W 30/12
See application file for complete search history.

(56) References Cited

U.S. PATENT DOCUMENTS 10,829,149 B1   11/2020 Garimella et al.
2019/0086929 A1  3/2019 Tamboli et al.
(Continued)

FOREIGN PATENT DOCUMENTS

CN    205469262 U   8/2016
CN    107972667 A   5/2018
(Continued)

OTHER PUBLICATIONS

International Search Report and Written Opinion for PCT/GB2021/053446 mailed Mar. 22, 2022 (10 pages).

*Primary Examiner* — Imran K Mustafa
(74) *Attorney, Agent, or Firm* — Kristin L. Murphy

(57) ABSTRACT

A lane keep assist system for an automotive vehicle includes an electric power steering assembly that is responsive to an output of the control system, the motor applying a torque to a part of a steering gear to steer the vehicle along a highway. The lane keep assist system assists a driver in keeping the vehicle in a lane of a highway, in which the control circuit comprises A PID Controller which receives at an input a target lane position for the closed-loop control system and provides as an output a control signal for a motor of the electric power steering assembly. The controller is arranged in a closed loop with the motor configured to minimise an error value indicative of the difference between the target lane position and the actual lane position of the vehicle.

14 Claims, 6 Drawing Sheets

(56) References Cited

U.S. PATENT DOCUMENTS

2019/0096257 A1* 3/2019 Alcazar ................ G05D 1/0212
2021/0004006 A1* 1/2021 Graves .............. B60W 30/0956

FOREIGN PATENT DOCUMENTS

| CN | 109177744 A | 1/2019 |
| CN | 110775057 A | 2/2020 |
| CN | 111038477 A | 4/2020 |
| JP | 2020181246 A | 11/2020 |

* cited by examiner

AUTOMOTIVE VEHICLE CONTROL CIRCUIT

CROSS-REFERENCE TO RELATED APPLICATIONS

This application is a national stage of International Application No. PCT/GB2021/053446, filed Dec. 30, 2021, the disclosure of which is incorporated herein by reference in its entirety, and which claimed priority to UK Patent Application No. 2020838.5, filed Dec. 31, 2020, the disclosure of which is incorporated herein by reference in its entirety.

TECHNICAL FIELD

This disclosure relates to improvements in automotive vehicle lane keep assist systems, and in particular to a circuit of a lane keep assist system that includes a PID controller.

BACKGROUND

A modern vehicle includes a wide range of motion control systems, with two very common systems comprising electric power steering (EPS) and electrically actuated brakes. An electric power steering system assist the driver in turning the steering wheel using an actuator in the form of a motor to apply an assistance torque.

One benefit of providing an EPS system is that it enables the vehicle to be steered independently of the inputs from the driver. This allows the steering to assist in the directional control of the vehicle, and one such system now being rolled out across many modern vehicles is known as Lane Keep Assist (LKA). The system requires a camera or other technology for lane detection and an image processing that processes the captured images to determine where the vehicle is relative to the lane or lanes. Signals from the image processor are fed into a controller, the signals including a target lane position for the vehicle obtained by processing images of the highway. The images are also processed to determine where the lane goes ahead of the vehicle so that the required heading angle needed to follow the lane can be fed into the controller. The controller compares the target lane position and target heading angle with an actual lane position and heading angle and then generates appropriate control signals for an electric motor of the steering. This motor applies a torque to the steering gear to turn the road wheel angle of the vehicle and steer the vehicle to ensure the target position and heading angle are maintained.

One suitable kind of controller that is commonly used in LKA systems is the PID controller. In use the target value, sometimes referred to as a set point value representing in this case the lane position or heading angle, is combined with a measure of that behaviour to provide an error signal indicative of the difference between what is demanded and what is actually happening. This error signal is fed into the PID controller which in turn outputs a control signal for the motor to track the setpoint value, the PID controller constantly adjusting the control signal so that the error signal is minimised and the tracking is achieved. This forms a closed loop control of the motion control system and can provide a highly accurate control for the actuator involved.

A PID controller is so called because it can use the three control terms, each typically expressed as a gain value Kp, Ki, Kd, which has a proportional, integral and derivative control effect on the signal output feedback from the control system. The principles are well known from the literature and can be expressed as:

SUMMARY

Referring to FIG. 1, a generic PID controller 1 for an actuator 2 or other controlled plant calculates an error value e as the difference between a desired setpoint Y_set and the behaviour Y of the controlled plant and applies a correction based on the proportional, integral, and derivative control terms from the error e. The controller attempts to minimize the error e over time by adjustment of the control signal u. In the case of a plant comprising a three phase direct current motor, this control actuation signal may define the voltages that are to be applied to the motor phases which may be generated by an inverter.

The performance of the controller can depend significantly on the selection of the three gain terms P I and D, and the process of selecting the gain terms is known in the art as tuning of the controller. The gain terms can generally be set to fixed values during a design phase of the system, and may be modified to suit a particular application in a vehicle. A problem with the fixing of the gain terms is that over time the tuning can become suboptimal as the system they are controlling changes internally in the features away from that in the design phase, and they can be suboptimal for certain changes in the operating conditions of the vehicle.

The applicant has proposed a lane keep assist system which ameliorates the limitations of prior art automotive vehicle control circuits as described above.

According to a first aspect the disclosure provides a lane keep assist system for an automotive vehicle which includes an electric power steering assembly that is responsive to an output of the control system, the motor applying a torque to a part of a steering gear to steer the vehicle along a highway, the lane keep assist system assisting a driver in keeping the vehicle in a lane of a highway, in which the control circuit comprises:

a PID Controller which receives at an input a target lane position for the closed-loop control system and provides as an output a control signal for a motor of the electric power steering assembly, the controller being arranged in a closed loop with the motor configured to minimise an error value indicative of the difference between the target lane positon and the actual lane position of the vehicle, and A neural network which has an input layer of neurons, at least one hidden layer of neurons, and an output layer comprising at least one output neuron, in which the neural network comprises a feedforward neural network that receives at the input layer of input neurons the target lane position, the control signal output from the controller and the error value, and in which the neural network is configured to determine the P gain, I gain and D gain terms used by the PID controller, and further in which the neural network receives as a feedforward term one or more of the vehicle speed and the curvature of the lane the vehicle is to be kept in.

The applicant has appreciated that the use of a neural network to tune the gain terms of a PID controller for a lane keep assist system allows for an additional degree of control of the vehicle electronic control system compared with the prior art which uses static look up table values.

The neural network may receive as a feedforward term one or more additional environmental variables.

The neural network may be configured to tune the P and I gain terms to cover the transient and steady period control, respectively and to tune the D terms to cover the damping adaptation/stability robustness The neural network may determine the gain values as respective nodal values within a hidden layer of the neural network.

By environmental variable we may mean a variable which is indicative of a parameter that is not used with the control loop of the PID controller.

The environmental variable may comprise at least one of the following commonly found in a vehicle motion control system:
- the speed of the vehicle,
- the lane curvature
- road/traffic measurements such as the lane curvature and speed limit etc.
- vehicle acceleration/reaction force
- the motor rotation speed/angle for the current/torque control
- steering torque or angle
- vehicle turn signal condition, e.g. turn indicated or turn not indicated The skilled person will understand that this is not intended to be an exhaustive list and other variables may be used within the scope of the disclosure.

The PID controller may be arranged to control the lane position of the vehicle, and output a control signal that is passed through a Heading angle controller to generate a suitable control signal for the electric motor. This control signal may comprise a current demand signal which is used by a motor drive stage to generate a set of Pulse width modulated waveforms for opening and closing switches of the drive stage.

In another exemplary arrangement, the PID controller may be configured to control both the lane position and the heading angle together, the output of the PID controller being fed directly to the drive stage of the motor. It may generate a single output value based on the error in both lane position and heading angle.

The neural network may generate updated gain terms during use of the LKA system as the vehicle is moving. These may be stored in an area of memory. They may be recalculated periodically by the neural network, for example each time the value of the one of the feedforward terms changes. This allows the gains to be continuously tuned to take into account variations over time.

The neural network may be fed with the set point signal input to the controller, and with the error signal.

The neural network controller may be realised in the discrete control form.

The signals input to the neural network may be updated periodically, and between each update the neuron values may be updated in response prior to inputting updated values to the neural network.

Each of these variables can vary as the vehicle is operated, and providing the at least one additional variable at the input point to the neural network provides a degree of further adaptation to the control of the actuator, enabling the error value better to be minimised in accordance with the environmental conditions change in use.

The weights and the neurons of the neural network may be pre-set prior to first use of the neural network to define a set of values for the gains P, I and D which minimise the error value assuming that the system operates for the nominal internal and external conditions, and the environmental value has no influence.

The pre-set weights and neurons may be stored in an area of memory.

During use of the control system the weights may be updated by a gradient-descent backpropagation scheme each time a new set of input values is supplied to the neural network, and the updated weights combine with the input values are used to update the neurons.

The weight update step may be controlled by a learning strategy unit defining the profile and step for the update.

Expressed mathematically the inputs and outputs from the neural network may comprise:
- $y^*\_set$ & $y^*$: discrete setpoint (target) & the measured behaviour of the actuator,
- $e^*$: the tracking error=$y^*\_set-y^*$:
- $u^*$: discrete PID control;
- $U^*$: discrete environment variables
- $K_p$, $K_i$ and $K_d$: discrete P(proportional), I(integral), D(derivative) Control Gains respectively.

In an exemplary arrangement the Neural Network is configured to perform a gradient descent learning for the inter-neuron weightings.

In an exemplary arrangement the neural network may determine the weights using a back propagation algorithm.

The or each environmental variable by the fed into the neutral network at an input layer. The control gains may be calculated as the neuron point values of respective neurons of a hidden layer of the neural network, and the control signal value may be generated at an output neuron of the neural network.

Once a new set of inputs have been fed to the input neurons of the neural network, the values of the hidden neurons can be calculated by a perceptron model upon the input values combined with the interneuron weightings applied between the input layer and the hidden layer.

The neural network may be configured to make the error term $e(k)$ a minimum using so-called the gradient descent back-propagation algorithm to perform the weights W training and update for the error function minimisation, to achieve the optimal PID control gains ($K_p$, $K_i$ and $K_d$), hence the desired PID control for the output signal.

The neural network may have a single hidden layer of neurons that connect the input layer neurons to the output layer.

The neural network PID controller may include processor configured to carry out the following sequence of steps:
- Input values updated;
- Weightings updated following the gradient descent back propagation scheme control combining with the input values, error and last control signal;
- The neuron values update calculation from the perceptron model using the input neurons and the weighting gains (W) applied to connections between the input neurons and the hidden layer neurons;
- Controller PID gain values updated based on the neuron values;
- Control signal output from the controller generated by applying gains to the error signal input to the PID controller.

The propagation of the signals through the neural network may be performed each time a new error signal is input to the PID controller and the output of the controller may only be generated once the neural network has completed the back propagation.

The lane keep assist system may be combined with an electric power steering system.

BRIEF DESCRIPTION OF DRAWINGS

There will now be described by way of example only, an exemplary arrangement of the present disclosure of which.

DETAILED DESCRIPTION

Figure 1:
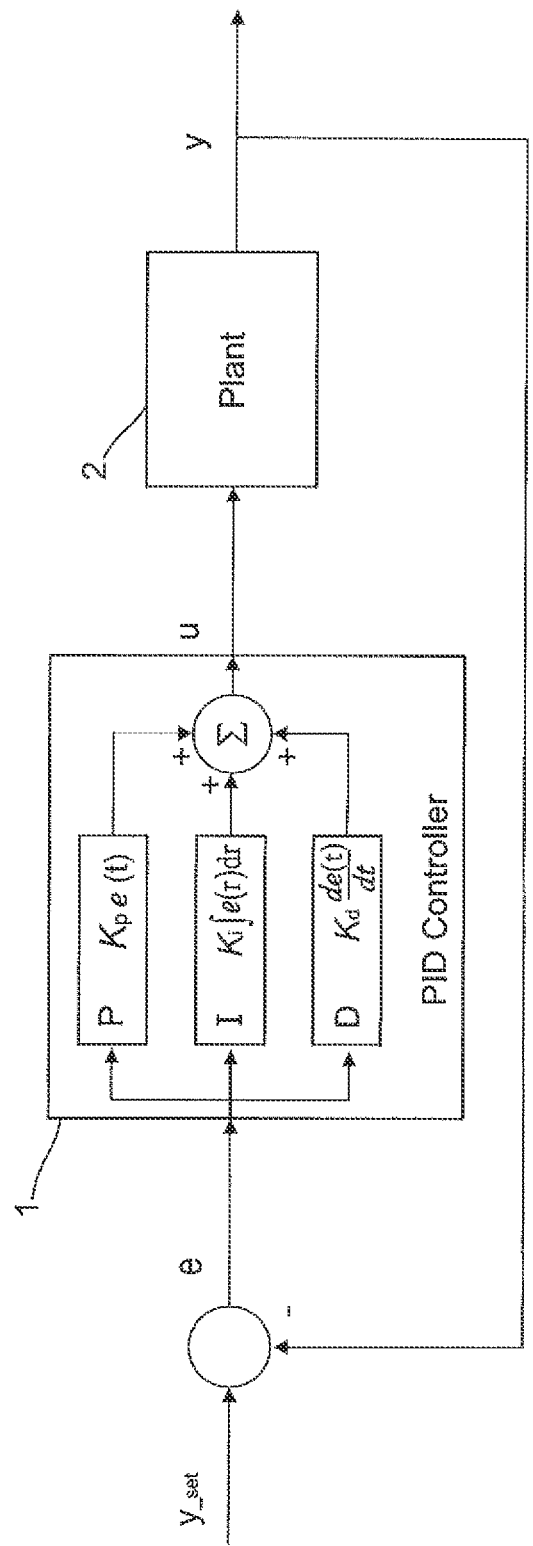
FIG. 1 is a schematic of a general PID Controller incorporated into a feedback loop where it controls the operation of a plant such as an electric motor.
Figure 2:
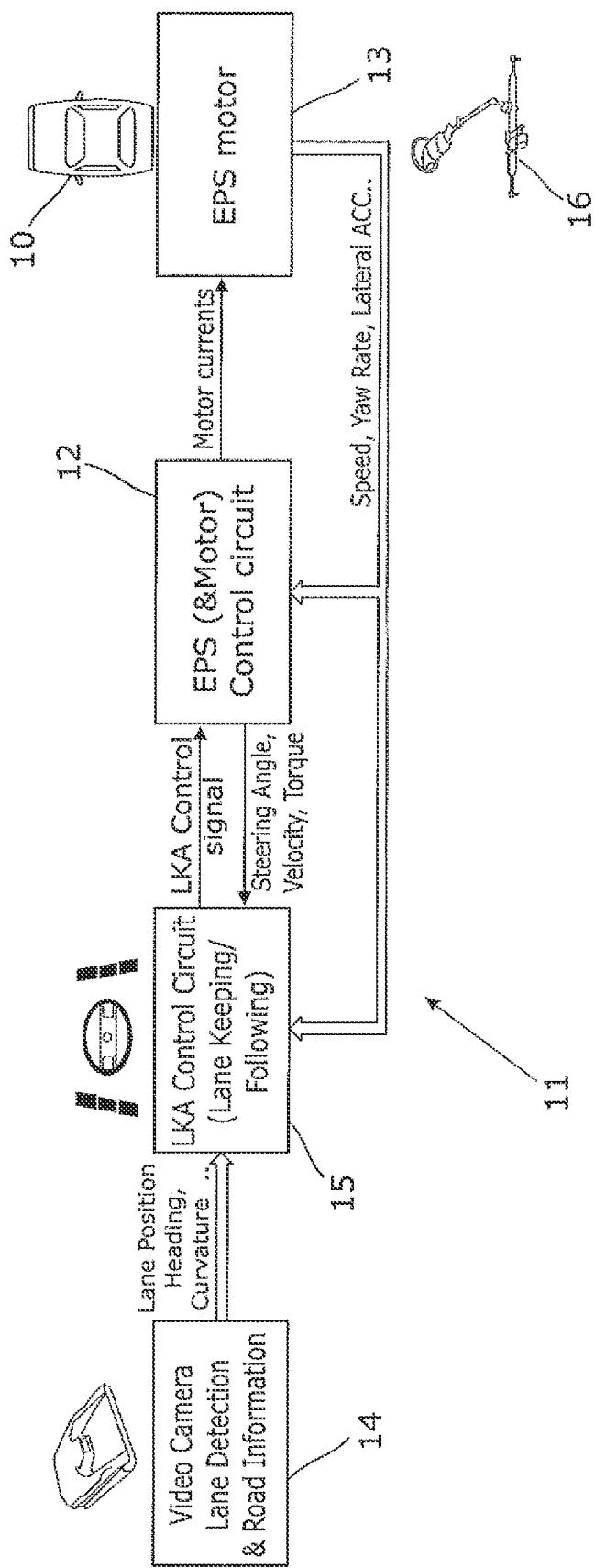
FIG. 2 is an overview of the key components of a vehicle fitted with an exemplary arrangement of a lane keep assistance system to help a driver steering a vehicle.

As shown in the FIG. 2, a vehicle 10 is fitted with a lane keep assist (LKA) system. This comprises a LKA control circuit 15 that includes a PID controller. The circuit 15 receives a target lane position and heading angle for the vehicle 10 from a processing circuit 14 that processes images of the highway from a video camera. The PID controller 15 provides a closed loop control of the lane position of the vehicle 10, and feeds control signals to a motor control stage of an electric power steering system (EPS) 12. The EPS 12 includes an electric motor 13.

The motor 13 of the electric power steering system (EPS) in use applies an assistance torque to a part of the steering such as a steering rack 16 to help the driver to steer the vehicle 10 and keep it travelling on the road within the lane.

The target lane position is generated by processing images of the highway obtained from a video camera or other imaging device or from a pre-set map of the highway. The PID Controller commands the vehicle to steer back towards the centre of a lane once the error towards the centre or vehicle heading out of the lane are detected.

The motor 13 may take a range of forms but in this example is a multi-phase pulse width modulated synchronous motor that outputs a torque in response to the control signal from the control circuit 12.

Figure 3:
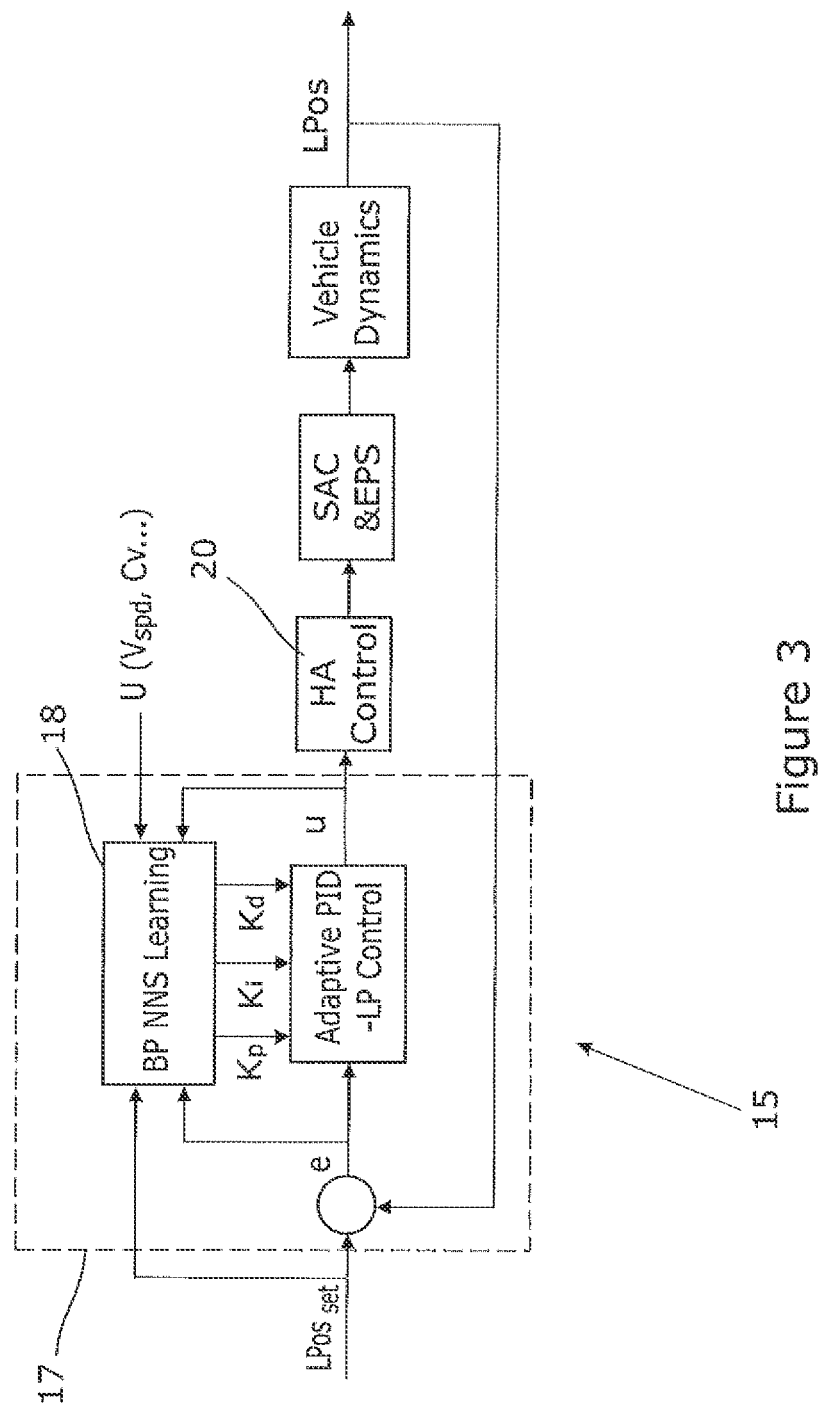
FIG. 3 is a schematic of the LKA system of FIG. 2 and includes a neural network to determine the gains of a PID controller.

The LKA control circuit 15 is shown in more detail in FIG. 3. The circuit includes a PID controller 17 that produces an output signal u as a sum of three terms, a proportional term, an integral term and a differential term. Each term is calculated by multiplying an error signal value by a respective gain term Kp, Ki, and Kd. The error signal is the difference between a target lane position LPos_set and an actual lane position LPos.

These gain terms are calculated in the example of FIG. 3 by a neural network 18 and stored in a memory where they can be accessed by the PID controller 17. The neural network 18 comprises a set of neurons 19 which receive inputs, followed by the process to combine the inputs with their internal state and weights, and perform the neuron values calculation using an activation function, and produce output using an output function. The initial inputs are external data which in this example comprise environmental variables that are relevant to the torque control for the lane keep assistance system.

The neurons 19 are arranged in a network of connections, each connection providing the output of one neuron as an input to another neuron. Each connection is assigned a weight that represents its relative importance. The propagation function computes the input to a neuron (activation function) from the outputs of its predecessor neurons and their connections as a weighted sum.

Figure 4:
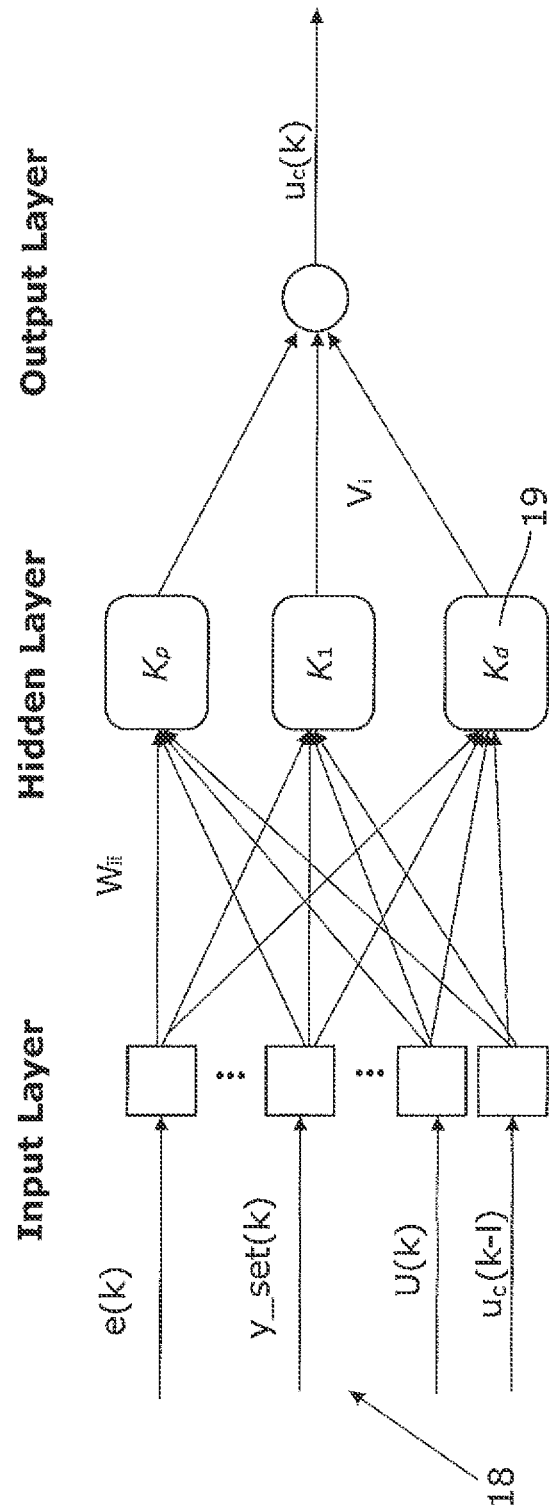
FIG. 4 is a representation of the interneuron connections of the neural network.

The specific neural network 18 used in the example system of FIG. 3 is a feedforward network with one hidden layer. The network has am input layer of neurons, an output layer comprising at least one output neuron, and at least on hidden layer of neurons. This is shown in FIG. 4. The neural network is configured to perform gradient-descent back-propagation learning to provide the P gain, I gain and D gain terms used by the PID controller. The neural network in this example is a single hidden layer neural network in which the hidden layer has three neurons, each neuron defining a value of a respective gain term for the PID controller. The neural network has a single output neuron defining the value of the drive signal for the motor.

Figure 5:
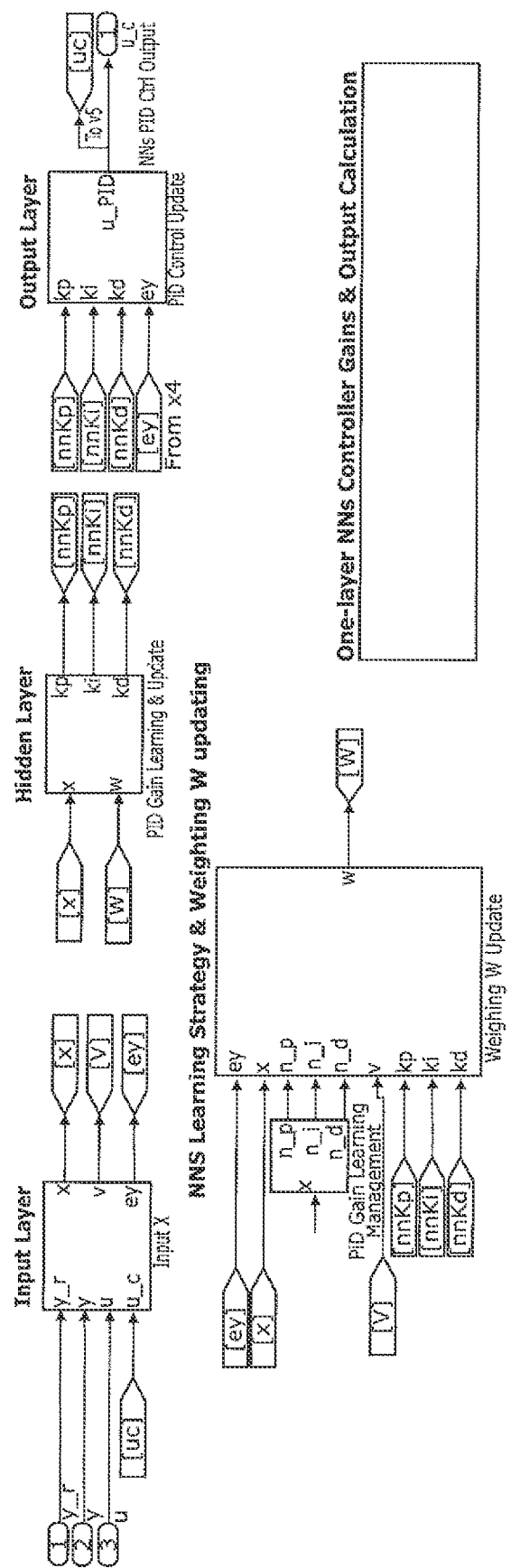
FIG. 5 shows the configuration and each the layer function block of the neural network PID controller implemented in Matlab/Simulink.

As shown in FIGS. 4&5 the neural network 18 receives at the input neurons the error value e, the target position signal, and the output control signal from the PID controller $u_c$.

The Neural network also receives as a feedforward term the vehicle speed and lane curvature The operation of the neural network and the discrete PID controller during use of the LKA system is as follows:

Step 1—the input values fed to the input layer neurons of the neural network are updated as is the set point signal fed to the PID controller;

Step 2: Obtain the kth step learning coefficient $\eta(K)$ from the simple (adaptive) formula Step 3—The Weightings between neurons in the neural network are updated following a back-propagation scheme combining with the input values, previous control signal and learning coefficient update Step 4—The Controller gain values are updated based on the hidden layer neuron values calculation by the perceptron model from the input neurons and the weighting gains W applied to connections between the input neurons and the hidden layer neurons, Step 5—the updated control signal $u_c$ is output from the PID controller generated by applying gains to the error signal input to the PID controller;

Step 6—the system output, here the motor current, and the associated environment variable(s), are measured and the values are fed back to the input of the PID controller Step 7—repeat steps 1 to 6.

The control signal U output from the PID controller 17 is fed into a Heading angle control circuit 20 which calculates a desired heading angle needed to move the vehicle towards or to keep at the desired position in the lane. The output of this circuit is then fed to the EPS system to control the motor.

Figure 6:
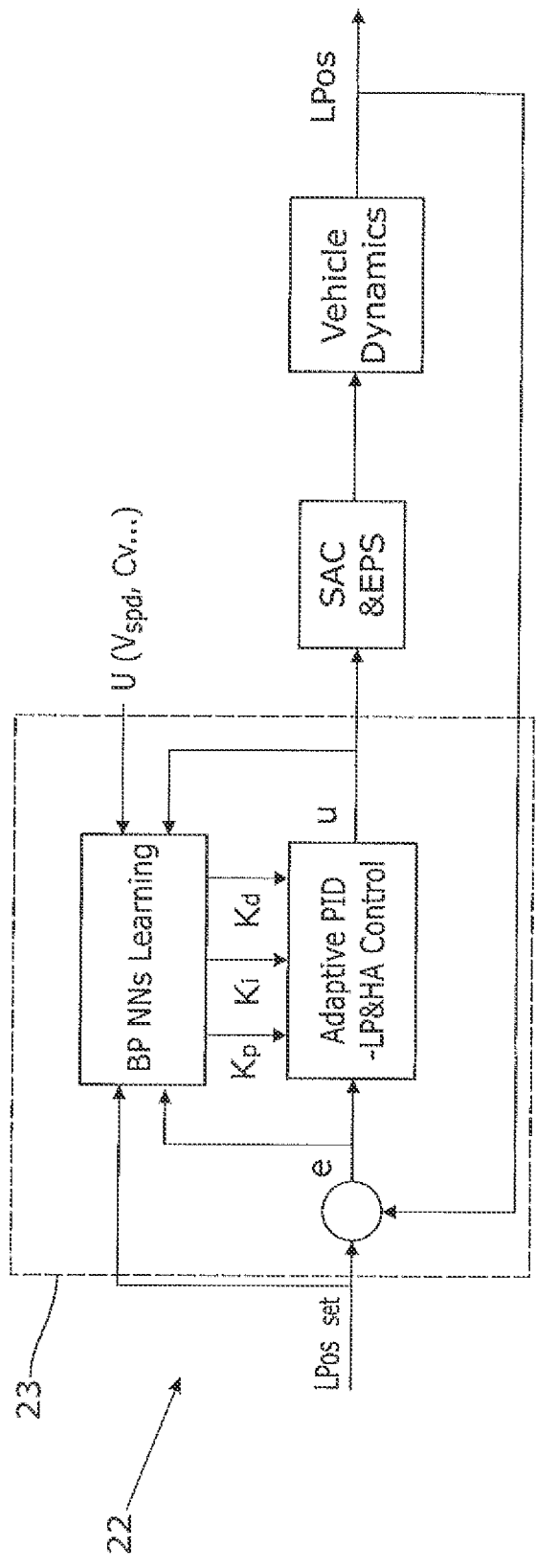
FIG. 6 is a schematic of another exemplary arrangement of a lane keep assist system for a vehicle.

FIG. 6 shows another exemplary arrangement of a lane keep assist system 22. This has the same features as the exemplary arrangement described above but the PID controller 23 is configured to output a signal that I can drive the error in both the target lane position and the heading angle to zero. As such the output of the PID controller can be fed directly into the motor drive stage if desired. The neural network may include additional feedforward terms such as the road and weather conditions, the powertrain/braking system requirements of the vehicle.

The invention claimed is:

1. A lane keep assist (LKA) system for an automotive Vehicle which includes an electric power steering assembly that is responsive to an output of a control system, the motor applying a torque to a part of a steering gear to steer the vehicle along a highway, the lane keep assist system assisting a driver in keeping the vehicle in a lane of a highway, in which the control system comprises:

a PID Controller configured to receive at an input a target lane position for the closed-loop control system and provides as an output a control signal for a motor of the electric power steering assembly, the PID controller being arranged in a closed loop configuration with the motor configured to minimise an error value indicative of the difference between the target lane position and the actual lane position of the vehicle, and a neural network including an input layer of neurons, at least one hidden layer of neurons, and an output layer comprising at least one output neuron, in which the neural network comprises a feedforward neural network that receives at the input layer of input neurons the target lane position, the control signal output from the PID controller and the error value, and in which the neural network is configured to determine the P gain, I gain and D gain terms used by the PID controller, in which the neural network determines the gain values as respective nodal values within a hidden layer of the neural network via gradient-descent backpropagation learning, wherein a respective gain term corresponds to a different neuron within the neural network, and further in which the neural network receives as a feedforward term one or more of the vehicle speed and the curvature of the lane the vehicle is to be kept in.

2. The ball screw drive according to claim 1, wherein the spindle nut has an anti-corrosion coating on an outside.

3. A system according to claim 1 in which the environmental variable comprises at least one of the following:
the speed of the vehicle,
the lane curvature,
road/traffic measurements,
vehicle acceleration/reaction force,
the motor rotation speed/angle for the current/torque control,
steering torque or angle, or
vehicle turn signal condition.

4. A system according to claim 1 in which the PID Controller is arranged to control the lane position of the vehicle, and output a control signal that is passed through a heading angle controller to generate a suitable control signal for the electric motor.

5. A system according to claim 1 in which the PID controller is configured to control both the lane position and the heading angle together.

6. A system according to claim 1 in which the neural network generates updated gain terms during use of the LKA system as the vehicle is moving.

7. A system according to claim 1 in which the neural network is fed with the set point signal input to the controller, and with the error signal.

8. A lane keep assist (LKA) system for an automotive vehicle which includes an electric power steering assembly responsive to an output of a control system, the motor applying a torque to a part of a steering gear to steer the vehicle along a highway, the lane keep assist system assisting a driver in keeping the vehicle in a lane of a highway, in which the control system comprises:

a PID Controller configured to receive at an input a target lane position for the closedloop control system and provides as an output a control signal for a motor of the electric power steering assembly, the PID controller being arranged in a closed loop configuration with the motor configured to minimise an error value indicative of the difference between the target lane position and the actual lane position of the vehicle, and a neural network including an input layer of neurons, at least one hidden layer of neurons, and an output layer comprising at least one output neuron, in which the neural network comprises a feedforward neural network that receives at the input layer of input neurons the target lane position, the control signal output from the PID controller and the error value, wherein the neural network is configured to determine the P gain, I gain and D gain terms used by the PID controller, in which the neural network determines the gain values as respective nodal values within a hidden layer of the neural network via gradient-descent back-propagation learning, wherein a respective gain term corresponds to a different neuron within the neural network, wherein the neural network receives as a feedforward term one or more of the vehicle speed and the curvature of the lane the vehicle is to be kept in.

9. A system according to claim 8 in which the neural network receives as a feedforward term one or more additional environmental variables.

10. A system according to claim 8 in which the environmental variable comprises at least one of the following:
the speed of the vehicle,
the lane curvature,
road/traffic measurements,
vehicle acceleration/reaction force,
the motor rotation speed/angle for the current/torque control,
steering torque or angle, or
vehicle turn signal condition.

11. A system according to claim 8 in which the PID controller is arranged to control the lane position of the vehicle, and output a control signal that is passed through a Heading angle controller to generate a suitable control signal for the electric motor.

12. A system according to claim 8 in which the PID controller is configured to control both the lane position and the heading angle together.

13. A system according to claim 8 in which the neural network generates updated gain terms during use of the LKA system as the vehicle is moving.

14. A system according to claim 8 in which the neural network is fed with the set point signal input to the controller, and with the error signal.

* * * * *